(12) United States Patent
Murphy et al.

(10) Patent No.: US 11,709,035 B2
(45) Date of Patent: Jul. 25, 2023

(54) TRANSLATING HARNESS WITH PASSIVE DISCONNECT

(71) Applicant: Raytheon Company, Waltham, MA (US)

(72) Inventors: Matthew G. Murphy, Tucson, AZ (US); John C. Feneck, Tucson, AZ (US); Michael S. Cherry, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/400,572

(22) Filed: Aug. 12, 2021

(65) Prior Publication Data

US 2023/0049500 A1 Feb. 16, 2023

(51) Int. Cl.
*F41F 3/055* (2006.01)

(52) U.S. Cl.
CPC .................................. *F41F 3/055* (2013.01)

(58) Field of Classification Search
CPC ...................................................... F41F 3/055
USPC ........................................................ 89/1.811
See application file for complete search history.

(56) References Cited

U.S. PATENT DOCUMENTS

| | | | |
|---|---|---|---|
| 2,775,745 A * | 12/1956 | Eaton | H01R 13/635 89/1.811 |
| 3,724,322 A | 4/1973 | Reed | |
| 3,780,617 A | 12/1973 | Tabarie et al. | |
| 4,092,898 A | 6/1978 | Witherspoon | |
| 4,508,404 A | 4/1985 | Frawley | |
| 5,122,067 A | 6/1992 | Sunne | |
| 5,710,388 A | 1/1998 | Hutchinson et al. | |
| 5,750,915 A * | 5/1998 | Bedegrew | B64G 5/00 244/173.1 |
| 6,227,096 B1 * | 5/2001 | Thomas | F42B 15/00 102/374 |
| 7,182,013 B1 | 2/2007 | Hardo | |
| 7,681,482 B1 * | 3/2010 | Kubinski | F41F 3/052 439/376 |
| 9,074,842 B2 | 7/2015 | Merems | |
| 9,810,347 B1 * | 11/2017 | Di Biasio | F16L 3/1091 |
| 2006/0214062 A1 * | 9/2006 | Shim | F42B 14/064 244/137.1 |
| 2008/0124961 A1 | 5/2008 | Cronin | |
| 2011/0265637 A1 * | 11/2011 | Hainze | F41F 3/052 89/1.806 |
| 2015/0122113 A1 * | 5/2015 | McMahon | F41F 3/06 89/1.811 |

FOREIGN PATENT DOCUMENTS

| | | | | |
|---|---|---|---|---|
| EP | 2392889 A2 * | 12/2011 | ............. | F41F 3/055 |
| FR | 2983288 A1 * | 5/2013 | ............. | F41F 3/055 |

* cited by examiner

*Primary Examiner* — Bret Hayes
(74) *Attorney, Agent, or Firm* — Bachman & LaPointe, P.C.

(57) ABSTRACT

A translating harness includes an umbilical within a translating assembly to define a translation distance. A method for operating the translating harness incudes launching a vehicle from a tube of a host system, the translating harness between a host system and the vehicle; completing a translation length of the translation harness; and disconnecting a vehicle connector of the translating harness from the vehicle while the vehicle is within the tube.

19 Claims, 6 Drawing Sheets

Before Actuation

After Actuation

TRANSLATING HARNESS WITH PASSIVE DISCONNECT

BACKGROUND

The present disclosure relates to a harness, and more particularly to a translating harness between a host system and a releasable vehicle.

Various vehicles may be launched from a host system. Before the host system and the vehicle are separated, there is typically a harness connected between the host system and the vehicle. When the releasable vehicle is mechanically separated from the host system, the harness must be disconnected. This harness separation may result in a disadvantageous disturbance to the vehicle such as during an Unmanned Aerial Vehicle (UAV) transition to flight.

SUMMARY

A translation harness according to one disclosed non-limiting embodiment of the present disclosure includes a translating assembly; and an umbilical at least partially sheathed by the translating assembly to define a translation distance.

A further aspect of the present disclosure includes, wherein the translating assembly comprises an inner sleeve slidable within an outer sleeve for predetermined translation distance, the umbilical affixed to the inner sleeve.

A further aspect of the present disclosure includes a groove in the inner sleeve to receive a clip ring to at least partially retain the inner sleeve within the outer sleeve.

A further aspect of the present disclosure includes a rim that extends from the inner sleeve to at least partially retain the inner sleeve within the outer sleeve, the translation distance defined between an end of the outer sleeve and the rim.

A further aspect of the present disclosure includes, wherein the translating assembly comprises a mount to which an outer sleeve is attached.

A further aspect of the present disclosure includes, wherein the mount is manufactured of a metal alloy and the outer sleeve is manufactured of a non-metallic material.

A further aspect of the present disclosure includes, wherein the umbilical is flexible.

A further aspect of the present disclosure includes, wherein the translating assembly provides a rigidity along a length of the umbilical.

A further aspect of the present disclosure includes, wherein the umbilical comprises a host system connector and a vehicle connector, the vehicle connector disconnects prior to the host system connector.

A launch system according to one disclosed non-limiting embodiment of the present disclosure includes a translating harness with a host system connector connected to the host system, and a vehicle connector connected to the vehicle, the vehicle connector disconnects prior to the host system connector upon launch of the vehicle from the host system.

A further aspect of the present disclosure includes, wherein the vehicle is contained within a sabot.

A further aspect of the present disclosure includes, wherein the sabot is contained within a launch tube.

A further aspect of the present disclosure includes, wherein the vehicle connector disconnects while the vehicle is within the launch tube during launch.

A further aspect of the present disclosure includes, wherein the translating harness translates for a translation distance upon launch until a rim that extends from an inner sleeve of the translating harness stops against an outer sleeve of the translation harness, the inner sleeve affixed to an umbilical such that the vehicle connector disconnects prior to the host system connector.

A further aspect of the present disclosure includes, wherein the outer sleeve of the translating harness is affixed to a sabot.

A further aspect of the present disclosure includes, wherein the outer sleeve of the translating harness is affixed to a bulkhead of a sabot that contains the vehicle.

A method for operating a translating harness according to one disclosed non-limiting embodiment of the present disclosure includes launching a vehicle from a tube of a host system, the translating harness between a host system and the vehicle; completing a translation length of the translating harness; and disconnecting a vehicle connector of the translating harness from the vehicle while the vehicle is within the tube.

A further aspect of the present disclosure includes, disconnecting a host system connector of the translating harness from the host system subsequent to the vehicle connector.

A further aspect of the present disclosure includes, launching a sabot and the vehicle within the sabot together from the tube.

A further aspect of the present disclosure includes, initiation of a working fluid system in the tube to pressurize an area in the tube aft of a bulkhead of the sabot.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary rather than defined by the limitations within and are non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
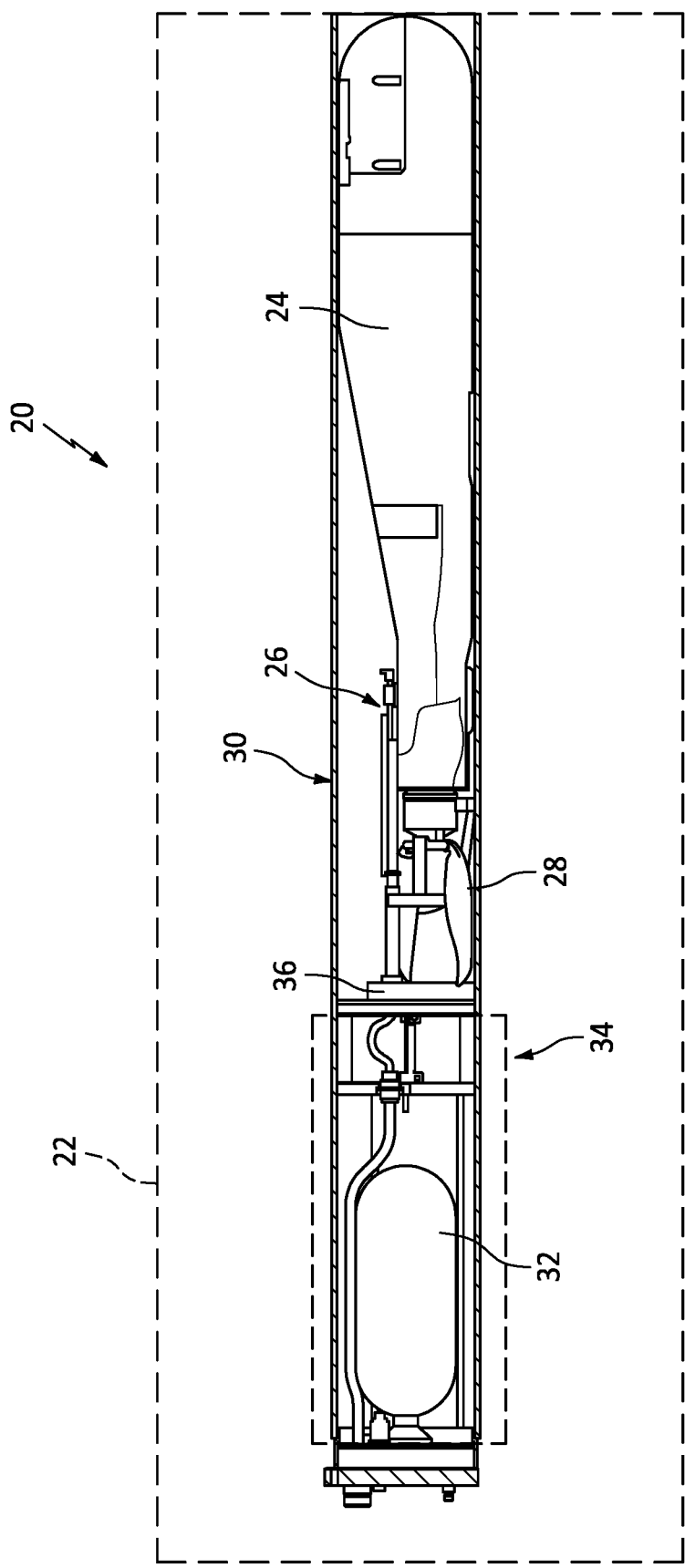
FIG. 1 is a schematic cross-sectional view of a launch system with a translating harness.

FIG. 1 schematically illustrates a launch system 20. The system 20 generally includes a host system 22, a vehicle 24, and a translating harness 26 therebetween. The host system 22 may, for example only, receive a tube 30 or other container-like system from which the vehicle 24 is launched. The vehicle 24 may, for example only, be an Unmanned Aerial Vehicles (UAV), spacecraft, satellite, rocket, missile, shell, or other system launched from the host system 22.

Although a tube 30 is illustrated in the disclosed embodiment, other types of launchers such as a container, rail, pod, etc., may also benefit herefrom.

Figure 2:
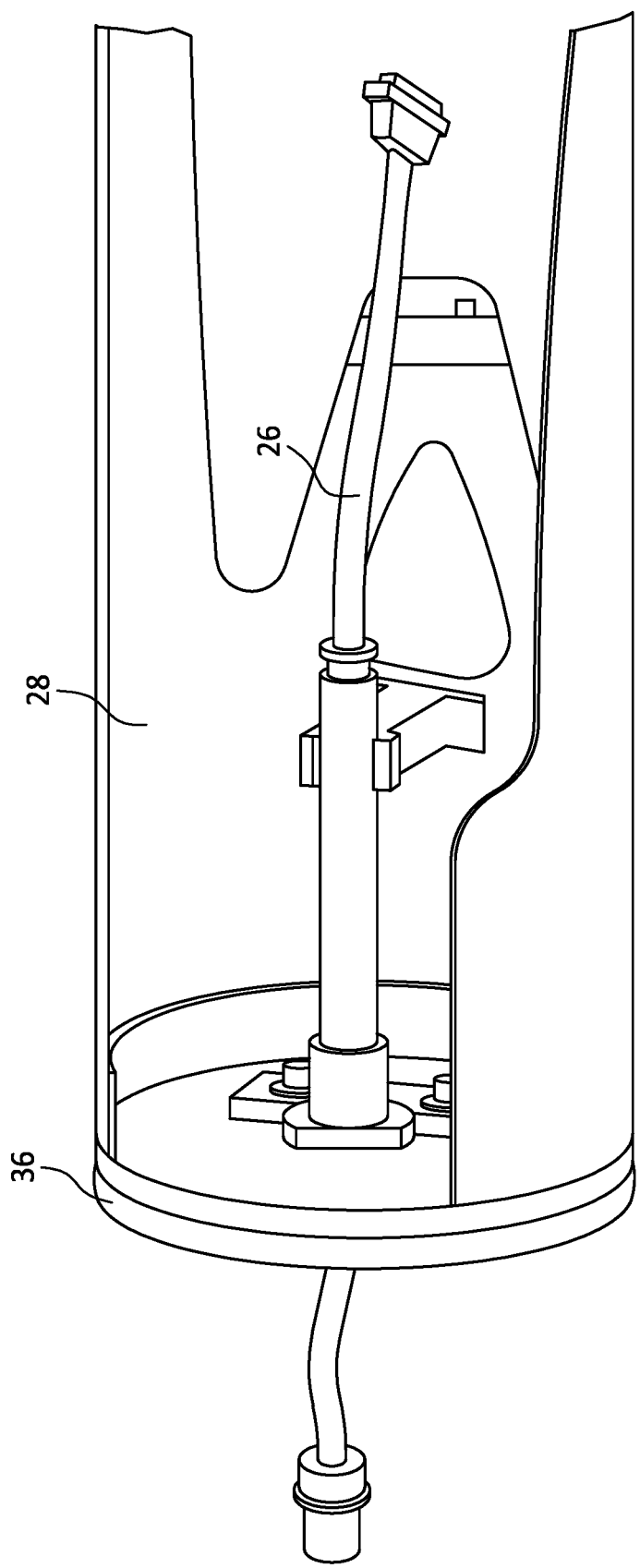
FIG. 2 is a perspective view of a sabot with a translating harness.

The vehicle 24 may be at least partially supported within a sabot 28 (also shown in FIG. 2) that is launched from within the tube 30 via a working fluid system 32, such as a pneumatic, gas generator, rocket launch, pyrotechnic or other launch source. The sabot 28 provides a bulkhead 36 that forms a sealed high pressure interface 34 to segregate the vehicle 24 from the working fluid system 32 to facilitate ejection of the vehicle 24 from the tube 30. That is, the sabot 28 and the vehicle 24 are launched together.

The translating harness 26 passes through the bulkhead 36 of the sabot 28 that forms the sealed high pressure interface 34. The translating harness 26 may be utilized to permit power, electrical communication of information, and operational commands to be communicated between the host system 22 and the vehicle 24. Alternatively, or in addition, the translating harness 26 may communicate a fluid (gas or liquid) to, for example, provide a pressurization gas, a cryogenic coolant, a fuel, or other material to the releasable vehicle 24 from the host system 22.

Figure 3:
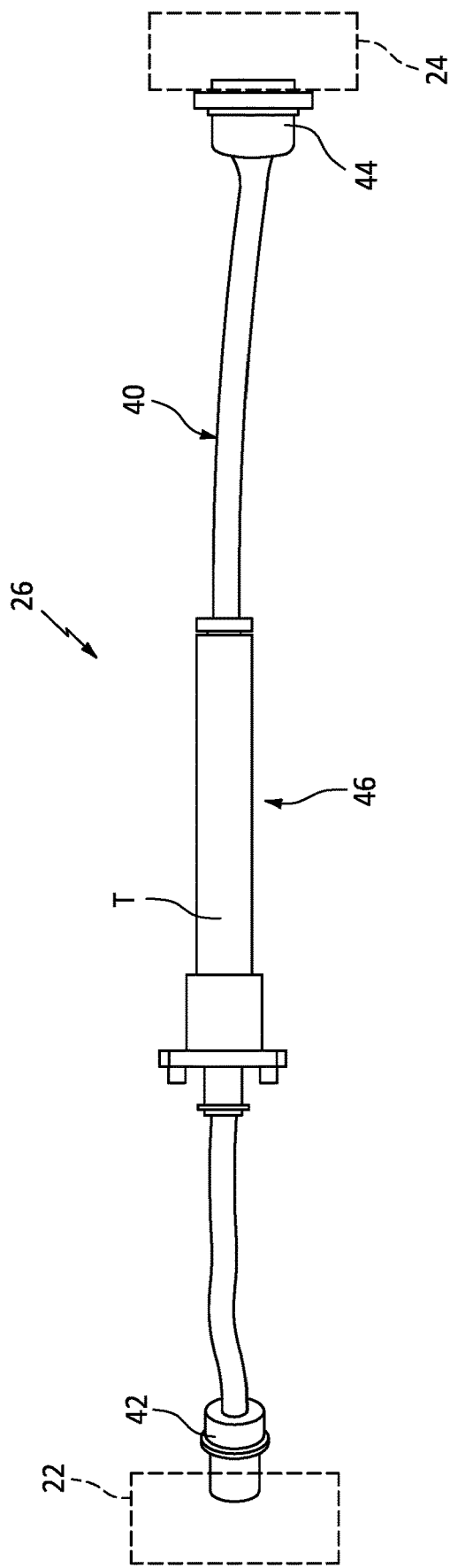
FIG. 3 is a side view of the translating harness.

With reference to FIG. 3, the translating harness 26 generally includes an umbilical 40 at least partially sheathed within a translating assembly 46. Distal ends of the umbilical 40 include a host system connector 42 for attachment to the host system 22 and a vehicle connector 44 for attachment to the vehicle 24. The umbilical 40 may be formed as a bundle of wires, conduits, tubes, etc., that are sheathed within an adhesive-lined, flexible, polyolefin tubing, adhesive-lined heat shrink, jacket, insulator, tape, etc., to form an at least somewhat flexible path between the connectors 42, 44. The translating assembly 46 defines an axis T that provides rigidity along a length of the translating harness 26. The rigidity facilitates control and positioning of the umbilical 40 within the sabot 28.

Figure 4:
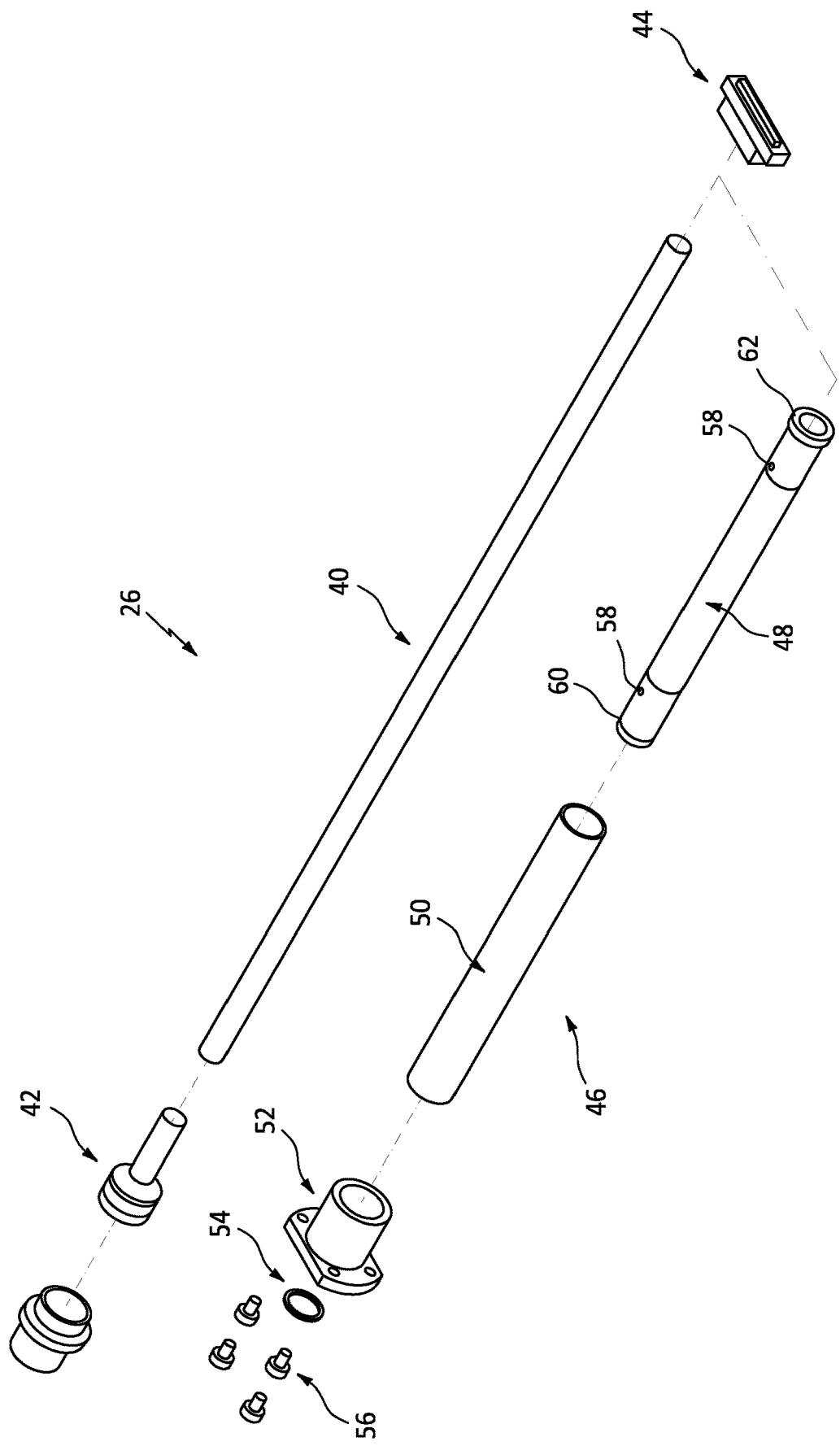
FIG. 4 is an exploded view of the translating harness.

With reference to FIG. 4, the translating assembly 46 may include an inner sleeve 48, an outer sleeve 50, a mount 52, a clip ring 54, and fasteners 56. The mount 52 may be bonded to the outer sleeve 50 which may also be supported in the sabot 28. The mount 52 attaches the outer sleeve 50 to the bulkhead 36 of the sabot 28 via the fasteners 56 (FIG. 4). In one embodiment, the mount 52 may be manufactured of a metal alloy material such as aluminum and the outer sleeve 50 may be manufactured of a non-metal material such as carbon fiber.

The inner sleeve 48 may be affixed to the umbilical 40 by, for example, a bonding material that may be injected through apertures 58 (See also FIG. 5) in the inner sleeve 48. The inner sleeve 48 is thereby affixed to the umbilical 40 along the length of the inner sleeve 48.

Figure 5:
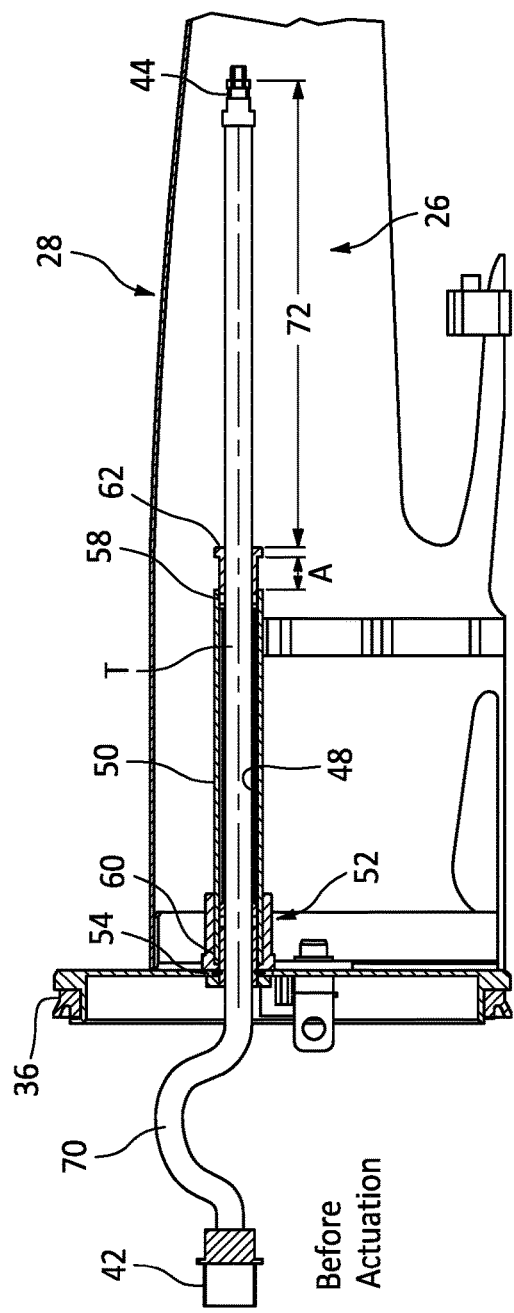
FIG. 5 is a schematic cross-sectional view of a sabot with a translating harness prior to launch.

With reference to FIG. 5, the inner sleeve 48 is slidably mounted within the outer sleeve 50 for a translation length A. The inner sleeve 48 is slidable for the translation length A defined between the clip ring 54 that is retained within a groove 60 formed in the inner sleeve 48 and a rim 62 of the inner sleeve 48. The rim 62 radially extends from the inner sleeve 48 to extend to be equivalent or beyond an inner diameter of the outer sleeve 50 to form a stop that controls or limits the translation length A of the inner sleeve 48 with respect to the outer sleeve 50 when translating from the position shown in FIG. 5 to the position shown in FIG. 7, which is further discussed below.

From an assembly perspective, in one non-limiting configuration, the mount 52 is bonded to the outer sleeve 50. The mount 52 is fastened to the bulkhead 36 of the sabot 28 via the fasteners 56. Once the inner sleeve 48 is bonded to the umbilical 40, the inner sleeve 48 and umbilical is slid into the outer sleeve 50 and retained thereto by the clip ring 54. Either or both of the connectors 42, 44 may then be attached to the umbilical 40 to form the assembled translating harness 26.

Figure 6:
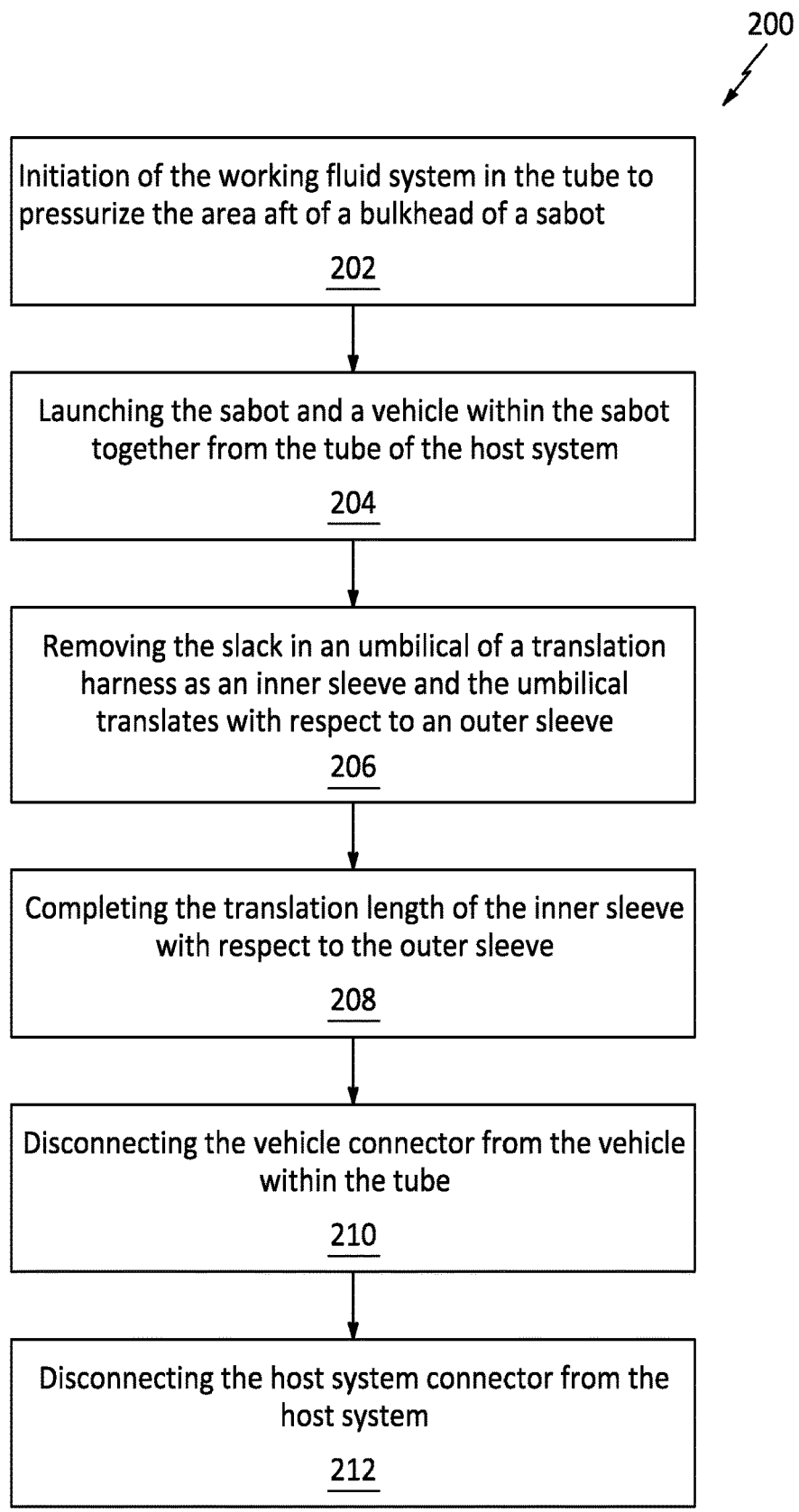
FIG. 6 is a block diagram of a method for operation of the translating harness.

With reference to FIG. 6, a method 200 of operation of the translating harness 26 is illustrated, wherein harness 26 is initially in a pre-launch condition (FIG. 5) in which the host system connector 42 is attached to the host system 22 and the vehicle connector 44 is attached to the vehicle 24. A predefined length 70 of the umbilical 40 may provide slack between the bulkhead 36 of the sabot 28 and the connection between the host system connector 42 and the host system 22. A length 72 of the umbilical 40 that extends from the inner sleeve 48 when attached to the vehicle 24 may also be predefined to provide a tidy installation path within the sabot 28 to avoid interference with portions of the vehicle 24, such as wings, propellers, etc. The umbilical 40, being partially supported by the translating assembly 46 assures a neat installation and the integrity of the connections to the host system 22 and the vehicle 24 for extended storage and handling of the tube 30 to provide what is commonly referred to as robust "wooden round" reliability.

Figure 7:
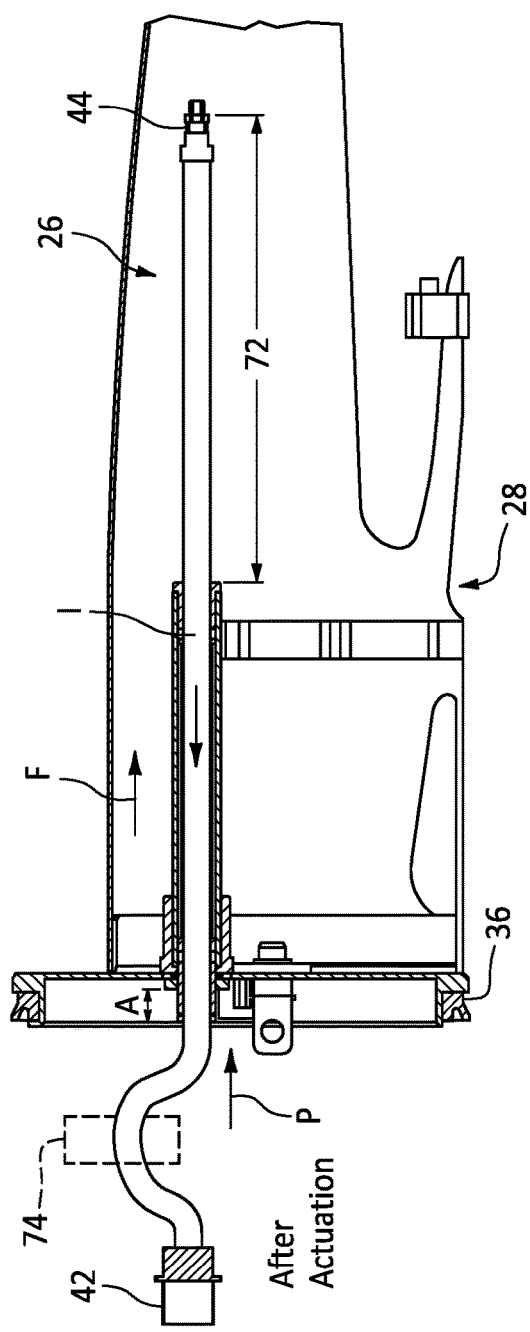
FIG. 7 is a schematic cross-sectional view of the sabot with a translating harness post launch.

Upon a launch command, the working fluid system 32 is initiated to pressurize the sealed high pressure interface 34 aft of the bulkhead 36 (202). The pressurization launches the sabot 28 and the vehicle 24 together from the tube 30 of the host system 22 (204). The pressurization provides a pressurization force P on the inner sleeve 48 which has a frictional force F in the outer sleeve 50 which is opposite an inertial force I of the umbilical 40 (FIG. 7).

As the sabot 28 and the vehicle 24 transit together though the tube 30, the slack in the umbilical 40 is removed and the inner sleeve 48 and umbilical 40 translates with respect to the outer sleeve 50 for the translation length A (206; FIG. 7). The translation length A may be, in one disclosed embodiment, 0.5 inches with respect to a 12 inch long translating assembly 46.

The translation length A may be completed (208; FIG. 7) when the rim 62 from the inner sleeve 48 contacts the outer sleeve 50. Once the translation length A is realized, the vehicle connector 44 disconnects from the vehicle 24 (210). This disconnection occurs within the tube 30 to avoid any harness induced tipoff of the vehicle 24 during launch.

Subsequent to the vehicle connector 44 disconnection from the vehicle 24, the host system connector 42 disconnects from the host system 22 (212). That is, the vehicle connector 44 of the translating harness 26 disconnects prior to the host system connector 42. The connector forces may be the primary driver of the disconnect sequence. Other forces may be accounted for to make sure the system operational sequence occurs at the desired pressure and accelerations. The mass, pressure, friction, etc., may alternatively or additionally be utilized as the prime driver that assures a net force that pulls the connectors in the sequence desired.

Alternatively, or in addition, a disconnect force between the host system connector 42 may be greater than the disconnect force of the vehicle connector 44 to further control the disconnect sequence.

In another embodiment, additional force can be provided between the host system connector 42 and the host system 22 to ensure that the vehicle connector 44 disconnects prior to the host system connector 42. The additional force may be achieved via an additional mass 74 (FIG. 7) mounted to the umbilical 40 aft of the bulkhead 36 of the sabot 28. The additional mass 74 need not be a point mass but may alternatively or additionally include the mass of the translating part of the assembly in general. For instance, the bonded translating tube could be manufactured of a heavier material, e.g., steel instead of aluminum to increase the mass of the total harness.

Alternatively, or in addition, an additional securing force may be incorporated into the host system connector 42. The additional securing force may be a frangible element such as a shear pin, ball detent retention, or other such feature.

The translating harness 26 provides specific control of the disconnect sequence to assure that the vehicle disconnect occurs inside the launch tube, thereby preventing harness induced tipoff of the vehicle during launch. The essentially self-contained translating harness 26 also facilities retrofit to various launch tubes 30.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A translation harness, comprising:
a translating assembly; and
an umbilical at least partially sheathed by the translating assembly to define a translation distance, wherein the translating assembly comprises an inner sleeve slidable within an outer sleeve for predetermined translation distance, the umbilical affixed to the inner sleeve, and further comprising a groove in the inner sleeve to receive a clip ring to at least partially retain the inner sleeve within the outer sleeve.

2. The translating harness as recited in claim 1, wherein the translating assembly comprises a mount to which an outer sleeve is attached.

3. The translating harness as recited in claim 1, wherein the umbilical is flexible.

4. The translating harness as recited in claim 3, wherein the translating assembly provides a rigidity along a length of the umbilical.

5. The translating harness as recited in claim 3, wherein the umbilical comprises a host system connector and a vehicle connector, the vehicle connector disconnects prior to the host system connector.

6. A translation harness, comprising:
a translating assembly; and
an umbilical at least partially sheathed by the translating assembly to define a translation distance, wherein the translating assembly comprises a mount to which an outer sleeve is attached, wherein the mount is manufactured of a metal alloy and the outer sleeve is manufactured of a non-metallic material.

7. The translating harness as recited in claim 6, wherein the translating assembly comprises an inner sleeve slidable within an outer sleeve for predetermined translation distance, the umbilical affixed to the inner sleeve.

8. The translating harness as recited in claim 7, further comprising a groove in the inner sleeve to receive a clip ring to at least partially retain the inner sleeve within the outer sleeve.

9. The translating harness as recited in claim 8, further comprising a rim that extends from the inner sleeve to at least partially retain the inner sleeve within the outer sleeve, the translation distance defined between an end of the outer sleeve and the rim.

10. A launch system, comprising:
a host system;
a vehicle; and
a translating harness with a host system connector connected to the host system, and a vehicle connector connected to the vehicle, the vehicle connector disconnects prior to the host system connector upon launch of the vehicle from the host system, wherein the vehicle is contained within a sabot, and wherein the sabot is contained within a launch tube, and wherein the vehicle connector disconnects while the vehicle is within the launch tube during launch.

11. A launch system, comprising:
a host system;
a vehicle; and
a translating harness with a host system connector connected to the host system, and a vehicle connector connected to the vehicle, the vehicle connector disconnects prior to the host system connector upon launch of the vehicle from the host system, wherein the translating harness translates for a translation distance upon launch until a rim that extends from an inner sleeve of the translating harness stops against an outer sleeve of the translation harness, the inner sleeve affixed to an umbilical such that the vehicle connector disconnects prior to the host system connector.

12. The system as recited in claim 11, wherein the vehicle is contained within a sabot.

13. The system as recited in claim 12, wherein the sabot is contained within a launch tube.

14. The system as recited in claim 11, wherein the vehicle connector disconnects while the vehicle is within the launch tube during launch.

15. The system as recited in claim 11, wherein the outer sleeve of the translating harness is affixed to a sabot.

16. The system as recited in claim 11, wherein the outer sleeve of the translating harness is affixed to a bulkhead of a sabot that contains the vehicle.

17. A method for operating a translating harness, comprising:
launching a sabot and a vehicle within the sabot together from a tube of a host system, the translating harness between the host system and the vehicle;
completing a translation length of the translating harness; and
disconnecting a vehicle connector of the translating harness from the vehicle while the vehicle is within the tube.

18. The method as recited in claim 17, further comprising disconnecting a host system connector of the translating harness from the host system subsequent to the vehicle connector.

19. The method as recited in claim 18, further comprising initiation of a working fluid system in the tube to pressurize an area in the tube aft of a bulkhead of the sabot.

* * * * *